3,312,720
3-DESOXY-19-NOR-ANDROSTENES
Filippus Johannes Zeelen, Oss, Netherlands, assignor to Organon Inc., West Orange, N.J., a corporation of New Jersey
No Drawing. Filed Mar. 19, 1962, Ser. No. 180,837
Claims priority, application Netherlands, Mar. 29, 1961, 262,988
14 Claims. (Cl. 260—397.5)

The invention relates to a process for the preparation of new 19-nor-steroids.

More particularly, the invention relates to the new 3-desoxy-19-nor-steroids of the general formula:

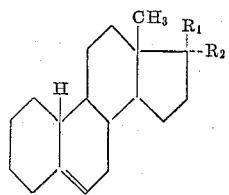

in which
$R_1$=OH or OAcyl,
$R_2$=hydrogen or a saturated or unsaturated hydrocarbon radical with 1–4 carbon atoms, or
$R_1$ and $R_2$=together a keto group.

The process for the preparation of this important biologically active group of compounds is characterized in that a $\Delta^5$-3-hydroxy-19-nor-steroid is taken as starting material, the 3-hydroxyl group of which is replaced in a known manner by a halogen atom or a sulfonyloxy group, after which the 3 substituent is split off by reduction.

It is a further object of this invention to provide the novel intermediates of the general formula:

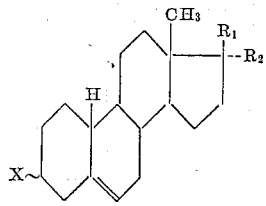

in which
X=a halogen atom or a sulfonyloxy group,
$R_1$=OH or OAcyl,
$R_2$=hydrogen or a saturated or unsaturated hydrocarbon radical with 1–4 carbon atoms, or
$R_1$ and $R_2$=together a keto group.

These compounds are useful for the preparation of the corresponding 3-unsubstituted 19-nor-steroids but are also valuable on account of their biological activities. These intermediates exert progestative, androgenic, anabolic, uterotrophic and gonad-inhibiting properties.

In the preparation of the compounds in accordance with the invention a $\Delta^5$-3,17-dihydroxy-19-nor-androstene-17-ester is taken as starting material, which is converted into the corresponding 3-desoxy compound by halogenation or sulfonylation and subsequent splitting off by reduction of the 3 substituent, converting either before or after the splitting off of the 3 substituent the compound obtained into the corresponding 17-keto compound, if desired, by oxidation or by saponification followed by oxidation, whereupon it can be converted by an addition reaction with a hydrocarbon metal derivative into the corresponding 17-hydroxy compound substituted in 17 position by a saturated or unsaturated alkyl group.

The thus prepared 17$\beta$-hydroxy- or 17-hydroxy-17$\alpha$-alkyl steroids can be esterified, if desired, with an organic or inorganic acid in order to obtain derivatives with enhanced or prolonged activity and/or water-soluble derivatives.

The present compounds are very important on account of their progestative, gonad-inhibiting and estrogenic activity.

The process according to the invention is carried out by converting a $\Delta^5$-3-hydroxy-19-nor-steroid in a known manner into the corresponding 3-halogen- or sulfonyloxy steroid. The starting products may be both 3$\alpha$- and 3$\beta$-hydroxy steroids.

The 3-hydroxyl group can be replaced by a halogen atom by treatment with phosphorus trichloride, phosphorus pentachloride, thionyl chloride, phosphorus oxychloride, phosphorus tribromide, phosphorus pentabromode or thionyl bromide. For preference the 3-hydroxy steroid is converted into the corresponding 3-chloro compound, for which conversion thionyl chloride is preferably used.

Of the thus obtained 3-halogen steroid the halogen atom is split off by reduction. The reduction can be carried out by treating the 3-halogen steroid with an alkali metal in the presence of a primary amine or liquid ammonia, or also by reduction with an alkali metal and an alcohol, for example, sodium-ethanol. For preference lithium is used for reduction in the presence of liquid ammonia.

Instead of replacing the 3-hydroxyl group by a halogen atom, this group can also be sulfonylated, after which by reductive splitting off the same final products are obtained. For the sulfonylation the 3-hydroxy steroid is reacted with a sulfonic acid or a functional derivative thereof. Usually a sulfonic acid halide is used.

As sulfonic acids can be used aliphatic, aromatic, or araliphatic acids, such as methane sulfonic acid, ethane sulfonic acid, benzene sulfonic acid, nitro-benzene sulfonic acids, parachlorobenzene sulfonic acid, toluene sulfonic acid, p-nitro-toluene sulfonic acid and the like.

The reductive splitting off of the sulfonyloxy group is performed by treating the steroid with, for example, an alkali metal in the presence of liquid ammonia or a primary amine. For preference an alkalimetal aluminum hydride, such as lithium aluminum hydride, is used for the splitting off of the 3-sulfonyloxy group.

Starting from the $\Delta^5$-3,17-dihydroxy-19-nor-androstene the corresponding 3-desoxy compound, hence the $\Delta^5$-17$\beta$-hydroxy-19-nor-androstene, is obtained according to the process described above.

This compound can be converted in a known manner into the corresponding 17-keto and the 17-hydroxy-17$\alpha$-alkyl compounds by oxidation followed by an addition reaction with a hydrocarbon metal derivative.

Oxidation of the 17-hydroxyl group takes place in a known manner, for example by the Oppenauer method or with chromium trioxide.

Alkylation in 17 position can be performed by adding a metal derivative of a saturated or unsaturated hydrocarbon to the 17-keto group. The metal derivative may be a magnesium halide, for example the magnesium bromide of the relative hydrocarbon. A special performance of the alkylation for the preparation of the 17-hydroxy-17-alkynyl compounds is characterized in that the 17-keto steroid is reacted with a triple unsaturated hydrocarbon in the presence of an alkali metal or an alkali metal compound, such as an alkali metal amide or alcoholate, or by adding a metal compound of a triple unsaturated hydrocarbon, such as an alkali metal or an alkaline earth metal compound, to the 17-keto group of the starting product. As equivalent of the processes stated above must be considered the method for the preparation of the desired 17-hydroxy-17$\alpha$-alkyl or alkenyl compounds, in which first the 17-keto-steroid is converted into a 17-hydroxy-17α-alkinyl compound by an addition reaction, after which this compound is converted into the corresponding 17-alkenyl or 17-alkyl compound by reduction, for example by means of hydrogen in the presence of a catalyst, such as nickel or Pd/BaSO$_4$. This route is mostly more advantageous than the method by which addition takes place directly, because the addition reaction with a metal derivative of a triple unsaturated hydrocarbon gives in most cases a better yield than the addition reaction with an alkane or alkene metal derivative.

Any hydrocarbon radical present in the final products in 17 position may be a saturated or unsaturated hydrocarbon, preferably with 1–4 carbon atoms, for example, a methyl, ethyl, propyl, butyl, isopropyl, vinyl, propenyl, allyl, methallyl, ethynyl, propynyl, propargyl or butynyl radical.

The oxidation and alkylation reactions described above can also be performed, if desired, before splitting off the 3-halogen or sulfonyloxy group.

If desired, the 17β-hydroxy and 17β-hydroxy-17-saturated or unsaturated alkyl compounds can be esterified by a method known per se. In the esterification inorganic acids, such as phosphoric acids, or organic carboxylic acids with 1–30 carbon atoms can be applied.

As examples of last-mentioned group are mentioned acetic acid, caproic acid, capric acid, lauric acid, behenic acid, hexahydrobenzoic acid, cyclopentyl propionic acid, phenyl propionic acid, succinic acid and tartaric acid.

The following examples illustrate the invention further.

*Example 1*

5 ml. of thionyl chloride are added to a solution of 4 g. of Δ$^5$-3α,17β-dihydroxy-19-nor-androstene-17-benzoate in 20 ml. of methylene chloride, after which the mixture is kept at room temperature for 20 hours. Then the mixture is poured out into ice water and extracted with methylene chloride. The extract is separated, washed and dried on sodium sulphate and finally evaporated to dryness. The residue is chromatographed over silicagel, in which process benzene-petroleum ether (1:1) is used as an eluate to obtain the Δ$^5$-3-chloro-17β-benzoxy-19-nor-androstene.

2.24 g. of this substance are dissolved in 60 ml. of absolute ether and subsequently added to a solution of 2 g. of lithium in 60 ml. of ethylamine at a temperature of 0° C. The mixture is stirred at 0° C. for 15 hours, after which 20 ml. of absolute ethanol are added. Then the mixture is poured out on ice and extracted with ether. The extract is separated, subsequently washed with water, dilute acid, water, sodium bicarbonate solution and with water, dried on sodium sulphate and evaporated to dryness. The residue is recrystallised from petroleum ether to obtain 1.4 g. of Δ$^5$-17β-hydroxy-19-nor-androstene. Melting point 116–117° C.; [α]$_D$=+4° (chloroform).

The same result is obtained when another 17-ester, such as the 17-acetate or 17-phenyl propionate is taken as starting material.

*Example 2*

5 ml. of 8 N Jones reagent are added to a solution of 4.44 g. of Δ$^5$-17-hydroxy19-nor-androstene in 450 ml. of acetone at 0° C. After standing for 10 minutes water is added to the mixture, after which it is extracted with chloroform. The extract is separated, washed, dried on sodium sulphate and evaporated to dryness. The residue is recrystallised from methanol to obtain the Δ$^5$-17-keto-19-nor-androstene. Melting point 66–69° C.; [α]$_D$=+79° (chloroform).

*Example 3*

Acetylene gas is bubbled through a solution of 3.2 g. of potassium in 50 ml. of benzene and 14 ml. of isopropanol till the solution is saturated. Next a solution of 5.0 g. of Δ$^5$-17-keto-19-nor-androstene in 25 ml. of benzene and 25 ml. of ether is added dropwise, whereupon acetylene gas is bubbled through for an additional 4 hours. The mixture is kept at room temperature for 18 hours, next cooled down to 5° C., diluted with a solution of 3 ml. of concentrated sulphuric acid in 23 ml. of water and poured out into ice water. The aqueous mixture is extracted with ether, separated, washed and dried on sodium sulphate and evaporated to dryness, after which the residue is recrystallised from methanol to obtain the Δ$^5$-17β-hydroxy - 17α - ethinyl-19-nor-androstene. Melting point 129–131° C. and [α]$_D$=−83° (chloroform; c.=1.0).

3 g. of this compound are dissolved in 15 ml. of dioxane, whereupon 6 ml. of acetic acid anhydride and some drops of dinitro benzene sulphonic acid are added. After stirring for 2 hours at room temperature 15 g. of ice and 15 ml. of pyridine are added and stirring is continued for an additional hour. The mixture is poured out into ice water, after which the precipitate formed is filtered, dried and recrystallised from ethanol to obtain 2.9 g. of Δ$^5$-17β-acetoxy-17α-ethynyl-19-nor-androstene. Melting point 76–78° C.

*Example 4*

2 g. of Δ$^5$-17β-hydroxy-17α-ethinyl-19-nor-androstene, obtained in accordance with the process of Example 3, are dissolved in 60 ml. of ethylacetate, whereupon 200 mg. of prehydrated 5% Pd–BaSO$_4$ in 6 ml. of ethylacetate are added. Then hydrogen is bubbled through the mixture till 2 mol. of H$_2$ have been taken up. After that hydration is interrupted, the solution filtered and evaporated to dryness. The crude residue (1.90 g.) is recrystallised from ethanol to obtain the Δ$^5$-17β-hydroxy-17α-ethyl-19-nor-androstene. Melting point 115–120° C.; [α]$_D$=−24° (chloroform).

When hydration is terminated after 1 mol. of H$_2$ has been taken up, the Δ$^5$-17β-hydroxy-17α-vinyl-19-nor-androstene is obtained. Melting point 120–121° C.; [α]$_D$=−27° (chloroform).

*Example 5*

25 ml. of thionyl chloride are added to a solution of 20 g. of Δ$^5$-3β-hydroxy-17β-benzyloxy-19-nor-androstene in 100 ml. of methylene chloride, after which the reaction mixture is treated further in accordance with the process described in Example 1 to obtain the Δ$^5$-3β-chloro-17β-benzyloxy-19-nor-androstene. Melting point 138–140° C.; [α]$_D$=+47°.

5.54 g. of this compound are dissolved in 150 ml. of methanol and 50 ml. of dioxane, whereupon a solution of 3 g. of potassium hydroxide in 20 ml. of water is added. The mixture is refluxed for three hours, after which it is poured out into water and the precipitate sucked off. Recrystallisation from a mixture of ether and petroleum ether yields the Δ$^5$-3β-chloro-17β-hydroxy-19-nor-androstene with the melting point of 125–126° C.; [α]$_D$=+15°.

3 g. of this compound are dissolved in 60 ml. of amyl alcohol, after which, while boiling, 6 g. of sodium are added in small pieces in a period of two hours. After that the mixture is refluxed for one and a half hours, whereupon the mixture is worked up in accordance with the process described in Example 1 to obtain the Δ$^5$-17β-hydroxy-19-nor-androstene. Melting point 117–119° C.; [α]$_D$=+3°.

*Example 6*

3 g. of the Δ$^5$-3β-chloro-17β-hydroxy-19-nor-androstene are dissolved in 100 ml. of absolute ether, after which a solution of 1.5 g. of lithium in 100 ml. of liquid ammonia is added dropwise. The mixture is stirred for 2 hours, whereupon 15 ml. of absolute ethanol are added. The ammonia is evaporated, after which the mixture, after the addition of water, is extracted with ether. The extract is separated and worked up in accordance with the process described in Example 1 to obtain 2.4 g. of Δ$^5$-17β- hydroxy-19-nor-androstene. Melting point 119–120° C.; $[\alpha]_D = -1°$.

Example 7

3.9 g. of $\Delta^5$-3β-chloro-17β-hydroxy-19-nor-androstene, obtained in accordance with Example 5, are dissolved in 390 ml. of acetone and cooled down to 0° C. Next 2.5 ml. of 8 N Jones reagent are added, after which the mixture is worked up further in accordance with the process described in Example 2, to obtain the $\Delta^5$-3β-chloro-17-keto-19-nor androsten. Melting point 134–136° C.; $[\alpha]_D = +81°$.

5 ml. of methyl iodide are added dropwise to a mixture of 1.1 g. of magnesium shavings and 25 ml. of absolute ether, after which the mixture is refluxed for 30 minutes. Next a solution of 2 g. of $\Delta^5$-3β-chloro-17-keto-19-nor-androstene in 100 ml. of absolute ether is added, whereupon the mixture is refluxed for an additional 4 hours. Then the reaction mixture is poured out into ice water, acidified with 2 N sulphuric acid, extracted with ether, washed with water, a sodium bicarbonate solution and again with water and finally dried on sodium sulphate and evaporated to dryness to obtain $\Delta^5$-3β-chloro-17β-hydroxy-17α-methyl-19-nor-androstene. Melting point 124–125° C.

The residue is dissolved in 60 ml. of absolute ether, after which a solution of 2 g. of lithium in 60 ml. of ethylamine is added dropwise at 0° C. The mixture is stirred for 15 hours at 0° C. and after that diluted with 20 ml. of absolute ethanol, poured out into ice, extracted with ether, washed and dried on sodium sulphate, evaporated and chromatographed over silica gel, in which process petroleum ether-benzene (1:9) is used as an eluate, to obtain 1.1 g. of $\Delta^5$-17β-hydroxy-17α-methyl-19-nor-androstene (melting point 182–183° C., which is kept at 140° C. for 7 hours, in notrogen atmosphere, in the presence of 13 ml. of phenyl propionic anhydride and then cooled down, poured out into a mixture of 10 ml. of water and 40 ml. of pyridine, kept at room temperature for one night after that diluted with water. The aqueous mixture is extracted with methylene chloride; the extract is separated, washed with sodium bicarbonate and water, dried on sodium sulphate and evaporated to dryness. The residue is evaporated a few times with benzent to obtain 0.95 g. of the $\Delta^5$-17β-hydroxy-17α-methyl-19-nor-androstene-17β-phenylpropionate. This compound has been obtained as an oil at room temperature; $[\alpha]_D = +3$ (chloroform; c.=1.0).

Example 8

3.55 g. of $\Delta^5$3β-hydroxy-17β-acetoxy-19-nor-androstene are dissolved in 20 ml. of chloroform, after which 0.4 ml. of phosphorus tribromide are added. The mixture is kept at room temperature for 20 hours and after that poured out into ice, extracted with methylene chloride and then worked up in accordance with the process described in Example 1, to obtain the $\Delta^5$-3-bromo-17-acetoxy-19-nor-androstene, which is converted into the $\Delta^5$-17β-acetoxy - 19 - nor-androstane (melting point 76–77°); $[\alpha]_D = -23°$ (chloroform) by reduction with lithium (0.3 g.) and liquid ammonia (20 ml.) and subsequent esterification with acetic anhydride in accordance with the processes described in Examples 6 and 3.

In a corresponding manner the $\Delta^5$-3β-hydroxy-17β-benzyloxy-19-nor-androstene is converted into the $\Delta^5$-17β-hydroxy-19-nor-androstene (melting point 117–118° C.) via the $\Delta^5$-3-bromo-17β-benzoyloxy-19-nor-androstene by means of thionyl bromide and subsequent reduction with lithium and liquid ammonia.

By esterification of this compound with palmitic acid chloride the $\Delta^5$-17β-hydroxy-19-nor-androstene-17-palmitate is obtained. Melting point 47–49° C.

Example 9

3.5 g. of p-toluene-sulphonic acid chloride are added to a solution of 4 g. of $\Delta^5$-3β-hydroxy-17β-benzyloxy-19-nor-androstene in 10 ml. of pyridine, after which the mixture is kept at room temperature for 18 hours. Then the mixture is poured out into ice, after which the precipitate formed is sucked off, dried and recrystallised from ethanol to obtain the $\Delta^5$-3-tosyloxy-17-benzoyloxy-19-nor-androstene.

Melting point 148–149° C.

5 g. of this compound are dissolved in 50 ml. of tetrahydrofuran and then slowly added dropwise to a boiling suspension of 1.2 g. of lithium aluminum hydride in 100 ml. of tetrahydrofuran. Then the mixture is refluxed for 10 hours, while after 2 hours and 5 hours 0.5 g. of litrium aluminium hydride is added. Then the mixture is cooled down to 0° C., diluted with a little water and filtered. The precipitate is washed with chloroform. The combined filtrates are dried on sodium sulphate and evaporated to dryness. The residue is chromatographed over silicagel (eluate petroleum-ether-benzene) to obtain the $\Delta^5$-17β-hydroxy-19-nor-androstene. Melting point 117–119° C.

In a corresponding manner the $\Delta^5$-3β-hydroxy-17β-benzoyloxy-19-nor-androstene is converted into the $\Delta^5$-3-methyloxy-17-benzoyloxy-19-nor-androstene by means of methane sulphonic acid chloride, which is after that converted into the $\Delta^5$-17β-hydroxy-19-nor-androstene by reduction. Melting point 118–120° C.; $[\alpha]_D = +2°$ (chloroform).

Starting from other esters of $\Delta^5$-3,17-dihydroxy-19-nor-androstene, such as the 17-acetate, butyrate and caprate, the $\Delta^5$-17β-hyrdoxy-19-nor-androstene, too, is obtained after sulfonylation and reduction.

Example 10

To a mixture of 2.35 g. magnesium, 32 ml. ether and 4.5 ml. allylbromide is added a solution of 1 g. $\Delta^5$-17-keto-19-nor-androstene in 10 ml. ether.

The mixture is stirred for 6 hours at room temperature, after which it is poured out into ice. The aqueous mixture is extracted with ether from which the $\Delta^5$-17β-hydroxy-17α-allyl-19-nor-androstene is obtained.

After recrystallisation from ether/petroleum ether this compound has a melting point of 122° C.; $[\alpha]_D = -20°$ (chloroform).

Example 11

To a solution of 1 g. $\Delta^5$-17β-hydroxy-17α-ethynyl-19-nor-androstene in 8.5 ml. tetrahydrofuran is added 2.5 ml. 2,3 - dihydropyran and 2 drops of phosphoroxychloride. The mixture is kept at room temperature for 3 hours, is poured out into water and extracted with methylenechloride. The solution is evaporated to dryness in vacuo after adding a little pyridine. This residue dissolved in 55 ml. ether is added to a solution of 140 mg. lithium and 65 mg. $Fe(NO_3)_3$ in 35 ml. liquid ammonia at a temperature of $-35°$ C. The mixture is stirred for 3 hours after which a solution of 3.5 ml. methyliodide in 16 ml. ether is added. The mixture is stirred for another 3 hours, 1,3 g. ammoniumchloride is added and the ammonia is distilled off.

The mixture is poured out into water and extracted with ether. The extract is evaporated and the residue dissolved in 15 ml. ethanol together with 200 mg. paratoluene sulphonic acid. After adding water the mixture is extracted with ether, the ether-extract is separated, and evaporated to dryness after which the residue is crystallized from ether-petroleumether to yield $\Delta^5$-17β-hydroxy-17α - methallyl-19-nor-androstene. Melting point 129–130° C.; $[\alpha]_D = -73.6°$ (chloroform).

Example 12

In accordance with the method described in Example 3 $\Delta^5$ - 3β-chloro-17-keto-19-nor-androstene has been converted into $\Delta^5$-3β-chloro-17β-hydroxy-17α-ethynyl-19-nor-androstene. Melting point 172–176° C.; $[\alpha]_D = -48.87°$ (chloroform).

By acetylation with acetic anhydride as described in Example 3 there has been obtained the 17-acetate of $\Delta^5$-3$\beta$-chloro-17$\beta$-hydroxy-17$\alpha$-ethynyl-19-nor-androstene. Melting point 100–102° C.; $[\alpha]_D = -49.9°$ (chloroform).

In an analogous way as described in Example 4 $\Delta^5$-3$\beta$-chloro-17$\beta$-hydroxy-17$\alpha$-ethynyl-19-nor-androstene has been reduced with hydrogen in the presence of 5% Pd-BaSO$_4$ to obtain $\Delta^5$-3$\beta$-chloro-17$\beta$-hydroxy-17$\alpha$-ethyl-19-nor-androstene. Melting point 104–105° C.; $[\alpha]_D = -2.87°$ (chloroform).

I claim:

1. Process for the preparation of a $\Delta^{5(6)}$-3-desoxy-19-nor-steroid comprising the steps of introducing into the 3 position of a $\Delta^{5(6)}$-3-hydroxy-19-nor-steroid a substituent selected from the group consisting of halogen, aliphatic sulfonyloxy, aromatic sulfonyloxy, and araliphatic sulfonyloxy, and then splitting off the 3-substituent by reduction with an alkali metal in the presence of a compound selected from the group consisting of a primary amine, an alcohol, and liquid ammonia.

2. Process for the preparation of a $\Delta^{5(6)}$-3-desoxy-17-hydroxy-19-nor-androstene-17-acylate comprising the steps of:
 (a) introducing into the 3-position of a $\Delta^5$-3,17-dihydroxy-19-nor-androstene-17-acylate a substituent selected from the group consisting of halogen, aliphatic sulfonyloxy, aromatic sulfonyloxy, and araliphatic sulfonyloxy;
 (b) splitting off the 3-substituent by reduction with an alkali metal in the presence of a compound selected from the group consisting of a primary amine, an alcohol, and liquid ammonia;
 (c) oxidizing the steroid thus obtained to a 17-keto derivative;
 (d) alkylating said 17-keto steroid with a hydrocarbon metal derivative to produce the corresponding 17-hydroxy-17-$\alpha$-alkyl-steroid; and
 (e) esterifying to obtain the corresponding 17-acylate.

3. Process according to claim 2, characterized in that the steps of oxidation, alkylation and esterification are performed before the reductive splitting off of the 3-substituent.

4. Process according to the claim 1, characterized in that the reductive splitting off of the 3-sulfonyloxy group is performed by treatment of the relative steroid with an alkali metal aluminum hydride.

5. New steroid compounds of the general formula:

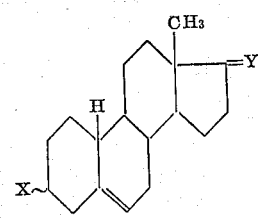

in which
 X is selected from the group consisting of hydrogen, halogen, aliphatic sulfonyloxy, aromatic sulfonyloxy, and araliphatic sulfonyloxy, and
 Y is selected from the group consisting of a keto group and R$_1$($\alpha$R$_2$), in which R$_1$ is selected from the group consisting of OH and OAcyl, and R$_2$ is selected from the group consisting of hydrogen, a saturated and an unsaturated hydrocarbon with 1–4 carbon atoms.

6. New steroid compounds of the general formula:

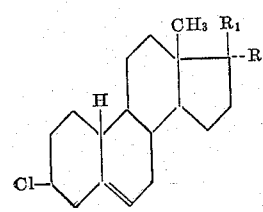

in which
 R$_1$ is selected from the group consisting of OH and OAcyl, and
 R$_2$ is selected from the group consisting of hydrogen, a saturated and an unsaturated hydrocarbon radical with 1–4 carbon atoms.

7. New steroids of the general formula:

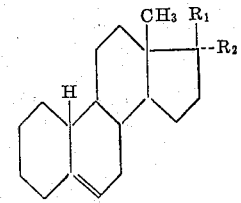

in which
 R$_1$ is selected from the group consisting of OH and OAcyl, and
 R$_2$ is selected from the group consisting of hydrogen, a saturated and an unsaturated hydrocarbon radical with 1–4 carbon atoms.

8. $\Delta^5$-17$\beta$-hydroxy-19-nor-androstene.
9. $\Delta^5$-17$\beta$-hydroxy-17$\alpha$-methyl-19-nor-androstene.
10. $\Delta^5$-17$\beta$-hydroxy-17$\alpha$-ethyl-19-nor-androstene.
11. $\Delta^5$-17$\beta$-hydroxy-17$\alpha$-ethynyl-19-nor-androstene.
12. $\Delta^5$-17$\beta$-hydroxy-17$\alpha$-allyl-19-nor-androstene.
13. A compound of the formula:

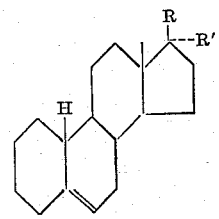

wherein R is selected from the group consisting of OH and O-hydrocarbon carboxylic acyl, R' is selected from the group consisting of H, lower alkyl, lower alkenyl and lower alkynyl and R and R' together is a keto group.

14. A compound of the formula:

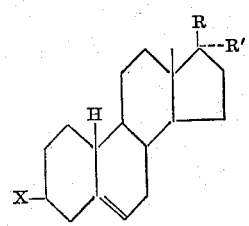

wherein R is selected from the group consisting of OH and O-hydrocarbon carboxylic acyl, R' is selected from the group consisting of H, lower alkyl, lower alkenyl and lower alkynyl and R and R' together is a keto group and X is halogen.

References Cited by the Examiner

UNITED STATES PATENTS

| | | | |
|---|---|---|---|
| 2,184,299 | 12/1939 | Hildebrandt | 260—397 |
| 2,189,130 | 2/1940 | Butenandt | 260—397 |
| 2,243,887 | 6/1941 | Serini et al. | 260—397.5 |
| 2,324,881 | 7/1943 | Ruzicka et al. | 260—586 |

LEWIS GOTTS, *Primary Examiner.*

M. LIEBMAN, ELBERT ROBERTS, *Examiners.*

HENRY A. FRENCH, *Assistant Examiner.*